(12) United States Patent
Shaffer (10) Patent No.: US 10,156,287 B2
(45) Date of Patent: Dec. 18, 2018

(54) CRANK-LESS MOTION CONVERTER

(71) Applicant: Donald Shaffer, Lake Ariel, PA (US)

(72) Inventor: Donald Shaffer, Lake Ariel, PA (US)

( * ) Notice: Subject to any disclaimer, the term of this patent is extended or adjusted under 35 U.S.C. 154(b) by 724 days.

(21) Appl. No.: 14/421,858

(22) PCT Filed: Sep. 2, 2013

(86) PCT No.: PCT/US2013/057761
§ 371 (c)(1),
(2) Date: Feb. 16, 2015

(87) PCT Pub. No.: WO2014/036544
PCT Pub. Date: Mar. 6, 2014

(65) Prior Publication Data
US 2015/0211611 A1    Jul. 30, 2015

Related U.S. Application Data

(60) Provisional application No. 61/696,258, filed on Sep. 3, 2012, provisional application No. 61/847,556, filed on Jul. 17, 2013.

(51) Int. Cl.
| F16H 21/36 | (2006.01) |
| F16H 21/18 | (2006.01) |
| F16H 21/20 | (2006.01) |
| F16H 21/22 | (2006.01) |
| F16H 21/34 | (2006.01) |

(52) U.S. Cl.
CPC ...... *F16H 21/365* (2013.01); *Y10T 74/18056* (2015.01)

(58) Field of Classification Search
CPC ........ F16H 21/36; F16H 21/365; F16H 21/18; F16H 21/20; F16H 21/22; F16H 21/34
See application file for complete search history.

(56) References Cited

U.S. PATENT DOCUMENTS

| 2,922,378 | A | * | 1/1960 | Pabst | F04C 2/3564 418/63 |
| 4,078,439 | A | * | 3/1978 | Iturriaga-Notario | F04B 27/02 123/197.1 |
| 4,640,144 | A | * | 2/1987 | McLendon | F01B 3/02 74/56 |
| 5,503,038 | A | * | 4/1996 | Aquino | F01B 9/06 123/197.1 |
| 2009/0272259 | A1 | * | 11/2009 | Cook | F02B 75/32 92/140 |

* cited by examiner

*Primary Examiner* — Tisha D Lewis (57) ABSTRACT

The invention is an apparatus to convert bidirectional rotary motion to unidirectional rotary motion having better mechanical advantage than a simple crank. It can make pedaling a bicycle easier or give an engine better mechanical advantage. It can also convert unidirectional rotary motion to bidirectional rotary motion, or continuous rotary motion to rotary motion with a momentary dwell. Each of these applications have input and output shafts on a common axis.

8 Claims, 5 Drawing Sheets

CRANK-LESS MOTION CONVERTER

CROSS-REFERENCE TO RELATED APPLICATIONS

This application claims the priority benefits of provisional application No. 61/696,258 filed on Sep. 3, 2012 by inventor Donald L. Shaffer, being titled "Rotary motion to or from oscillating motion;" nonprovisional application Ser. No. 13/855,661 filed on Apr. 2, 2013 by inventor Donald L. Shaffer but with missing claims which were uploaded May 19, 2013, being titled "Motion Converter;" and provisional application No. 61/847,556 filed on Jul. 17, 2013 by inventor Donald L. Shaffer, being titled "Motion Converter Cardan Style."

STATEMENT REGARDING FEDERALLY SPONSORED RESEARCH OR DEVELOPMENT (IF APPLICABLE)

Not Applicable.

REFERENCE TO SEQUENCE LISTING, A TABLE, OR A COMPUTER PROGRAM LISTING COMPACT DISC APPENDIX (IF APPLICABLE)

Not Applicable.

BACKGROUND OF THE INVENTION

In many mechanisms and devices there is a need to convert motion of one type to another. When converting from linear motion to rotary motion, cranks are often used. This is the case in most internal combustion engines. It is well known that the crank and slider mechanism suffers in mechanical advantage of transferring linear forces of the pistons to a crank by a connecting rod. When pressures are highest in the combustion chamber, the mechanical advantage of transferring that force from the piston to torque on the crank is poor. By the time the piston has good mechanical advantage because of the angle of the crank, the pressures are being reduced because of expansion and cooling.

The current invention transfers a bidirectional oscillating rotary motion from a pendulum type engine to rotary output. It has good mechanical advantage for practically all of the power stroke. Rather than momentarily having good mechanical advantage as with the crank and slider, it momentarily has a needed poor mechanical advantage as the oscillating pendulum engine changes direction of rotation. Mechanical advantage is good even when pressures are highest. This can be a key to efficiently and effectively transferring forces from an engine to torque of a rotational output.

It is known that with a hypocycloid gear set where there is a stationary ring gear with a planet gear of exactly half the diameter meshing within it, a selected point at the pitch circle of the planet gear travels in a linear path through the diameter of the ring gear. The same thing can be done without gears by using three linear bearings going to three points on what would be the pitch circle of the planet gear. A similar effect was invented by Cardano in the 16th century. His gear set used a stationary sun gear rather than the stationary ring gear and two planet gears meshing with each other. The same effect can be done by using sprockets and chains, or with cogged pulleys and belts. The current invention makes use of the principles of those devices which convert between rotary motion and linear motion without using a crank.

The preferred embodiment of the apparatus of the current invention has exactly the same behavior in both directions of oscillation. Exactly half a turn of the rotary shaft is used for each direction of the oscillation in some embodiments, or in other embodiments a full rotation of the rotary shaft yields one direction of oscillation. Also, acceleration and deceleration of the oscillating member is the same for both directions in some embodiments, or behavior can be altered in other embodiments. And the force is more efficiently transferred in the apparatus of the current invention than in other solutions. This apparatus can find uses anywhere where its motion conversion can be beneficial, but was designed with the goal of transferring forces of oscillating rotary motion from a pendulum type engine to torque in continuous rotary motion.

The apparatus of the current invention can also find uses in other types of motion conversion besides oscillating to rotary or rotary to oscillating. By holding what would be the rotary member stationary and instead rotating what would have been the stationary member, what would be the oscillating member has a rotary motion with a momentary dwell. Other behaviors can also be caused with a combination of inputs.

The four bar crank and rocker mechanism has the rotary motion on one axis and the oscillating motion on another axis. The current invention can have both on the same axis. Where it is desirable for both motions to be on the same axis, the apparatus of this invention may have extra value.

BRIEF SUMMARY OF THE INVENTION

The current invention is an apparatus comprising two gear sets, or devices capable of doing the same thing as said gear sets using the same principles, said gear sets or devices having a selected point which generates a linear motion from rotary motion without using cranks. In preferred embodiments, one of the said gear sets or devices is designed to generate a shorter linear motion than the other said gear set or device. The said gear sets are of the hypocycloid type or Cardan style. The said devices are variations of the said gear sets which accomplish the same thing. The said gear sets and devices will be further described in the description of the drawings and detailed description, and shall be referred to as crank-less motion converting devices.

The said crank-less motion converting devices are oriented to have the same central axis in preferred embodiments, or parallel central axes in other embodiments. In other words, they are oriented to be on parallel planes. Said crank-less motion converting devices are further oriented so that the linear motions generated by said crank-less motion converting devices are parallel. In a special case the said generated linear motions are of equal length, but in preferred embodiments one of the said crank-less motion converting devices generates a longer linear motion than the other said motion converting device. The said motion converting devices are further oriented so that the shorter generated linear motion doesn't extend further in either direction than the longer generated linear motion.

The said crank-less motion converting devices comprise a means of being drivingly connected, and are assembled so that the members that generate the linear motions line up so they can be drivingly connected at the points that generate the linear motions.

The planet carrier of said crank-less motion converting device that generates the shorter linear motion is free to make continuous rotations. Since the two said crank-less motion converting devices are drivingly connected on the linear path, but one generates a shorter linear motion, that said crank-less motion converting device limits the motion of the crank-less motion converting device that would generate the longer linear motion. The result is that while the planet carrier of the one said crank-less motion converting device makes complete rotations, the other planet gear and its carrier of the other crank-less motion converting device are slowed down and the direction of rotation is reversed.

One skilled in the art will realize that in the special case where the lengths of the generated linear motions are equal, there are more degrees of freedom and the planet carrier of either crank-less motion converting device can change directions or both can continue to rotate. In said special case, if one said planet carrier changes directions, the other said planet carrier needs to momentarily stop before continuing.

If the said shorter generated linear motion of one said crank-less motion converting devices doesn't extend as far in either direction as the linear motion of the other said crank-less motion converting device; then for each rotation of the continuously rotating planet carrier, the oscillating planet carrier will travel both directions of oscillations, those oscillations being less than 180 degrees. If the two said crank-less motion converting devices are oriented so that both of the generated linear motions extend the same amount in one direction, then the planet carrier of the crank-less motion converting device that generates the shorter linear motion would allow the other crank-less motion converting device to continue rotating at that end of the linear motion. The oscillating planet carrier is then limited to less then 360 degrees and would have one direction of oscillation to one rotation of the continuously rotating planet carrier of the other said crank-less motion converting device.

The apparatus of the current invention uses two crank-less motion converting devices which generate straight line motions from rotary motions. There are various devices which can accomplish that, some of which will be described. Any mix of those crank-less motion converting devices can be comprised in the said apparatus of the current invention.

The said apparatus can be used to convert unidirectional rotary motion to bidirectional rotary motion; convert bidirectional rotary motion to unidirectional rotary motion; convert continuous rotary motion to rotary motion with a momentary dwell; or could also be used to control the extents and behavior of the oscillation of a machine or device designed to oscillate. In the latter case its purpose may not be to transform power from oscillating to rotary, but to control the oscillation and recover kinetic energy left over from one direction of oscillation and reintroduce it into the other direction of oscillation. This could be the case with a pendulum type engine with a generator that oscillates with it.

BRIEF DESCRIPTION OF THE SEVERAL VIEWS OF THE DRAWING

The drawings are meant to illustrate the concept of the invention rather than to show what the parts look like. One series of drawings will illustrate the preferred embodiment using two hypocycloid gear sets where the stationary ring gear is twice the size of the essential planet gear meshing with it. The next series of drawings will illustrate the concept using Cardan style gear sets with stationary sun gears to do the same thing. A third series of drawings will illustrate a variation of the Cardan style gear sets where the sun gear and second planet gear are changed to sprockets with a roller chain or to notched pulleys with a notched belt; or an equivalent. The last drawing will illustrate a device which accomplishes the same thing as the hypocycloid gear set using linear bearings rather than gears. Since all of these gear sets can generate the straight line motion, any combination of them can be used for the two crank-less motion converting devices comprised in the apparatus of the current invention. For brevity, the drawings will only illustrate crank-less motion converting devices of the same type. The difference in sizes of the two crank-less motion converting devices can vary, or in the special case, can be equal.

DETAILED DESCRIPTION OF THE INVENTION

The concept of the Crank-less Motion Converter will be explained so that one skilled in the art will be able to understand and build it. The gear sets and devices comprised in the current invention are well known in prior art. Said prior art are devices which convert between unidirectional rotary motion and reciprocating linear motion. This invention is novel in that it uses a combination of prior art to accomplish something new and beneficial.

When this description makes reference to gears in the drawings, note that the drawings generally show the pitch circles of the gears and not the teeth. That is because the pitch circles are the important thing to understanding the invention. Any type of gears can be used. By "gears" or "meshing," what is meant is any type of gearing; including friction, sprocket and roller, pulley and belt, magnetic gearing, or the gear-less solution using linear bearings to make the motion of an imaginary circle rolling inside of a stationary imaginary circle as if a hypocycloid gear set.

In this invention motion is converted by an apparatus comprising two sets of gears. These said sets of gears can be of any of the types described, or a combination of two kinds. The type of motion conversion depends on what part of the apparatus is used for input, which part is used for output, which part is held stationary, or whether there is a combination of inputs. The apparatus will first be described as a converter of unidirectional rotary motion to bidirectional rotary motion. Then it can better be understood for other motion conversions.

In a special case, the said gear sets can be the same diameter, but the case of the second said gear set being larger than the first will be described. One skilled in the art will understand that having the gear sets the same diameters would give more degrees of freedom and may require extra measures to ensure it works as desired.

In the preferred embodiment of hypocycloid type gear sets, each of said sets of gears comprise an internal ring gear 1, 4 and and a planet gear 2, 5 with a pitch circle exactly half the diameter as the pitch circle of the ring gear 1, 4 it meshes with. Those planet gears 2, 5 will be referred to as essential planet gears and are mounted on carriers 10, 12 respectively. Other planet gears 6, 7 can optionally be included for reasons which could include to distribute the forces to multiple points in the gear sets.

The said preferred embodiment of his invention uses the known fact that in such an arrangement where the essential planet gear's pitch circle 2 is half that of the ring gear's pitch circle 1, a given point 3 on the essential planet gear's pitch circle 2 will take a straight path through the diameter of the ring gear 1 as the planet gear 2 travels in mesh with the ring gear 1. A second similar gear set is arranged alongside that said gear set and in preferred embodiments sharing the same central axis, in which case the planet carrier of the larger said gear set oscillates with the same acceleration and deceleration in both directions.

In embodiments where the two said gear sets don't share the same central axis, if it is desired that one planet carrier can make complete rotations, the shorter linear motion generated by the first said gear set can't extend in either direction beyond the extent of the longer linear motion generated by the second said gear set.

In embodiments where the shorter generated line of the one said gear set doesn't extend as far in either direction as the longer generated line of the other said gear set, the smaller essential planet gear 2 of the first said gear set will, while continuing to rotate, stop and change directions of the larger essential planet gear 5 of the second said gear set; resulting in the planet carrier 12 of the second said gear set changing directions twice per rotation of the planet carrier 10 of the smaller said gear set.

In embodiments where the shorter and longer linear motions generated by the two said gear sets extend to the same extent at one end, the planet carrier 12 of the larger said gear set can continue without changing directions until the point 3 where the essential planet gears 2, 5 are drivingly connected reaches its limit allowed at the other end of the generated linear motion by the smaller said essential planet gear 2. In this case, the oscillating planet carrier 12 makes one direction of oscillation per one rotation of planet carrier 10.

If the linear motions generated by the two said gear sets are closer to the same length, the oscillating planet carrier 12 will rotate more degrees than if there is a greater difference in the lengths of the generated linear motions. In that case where the generated linear motions are closer to the same length, acceleration and deceleration of the oscillating planet carrier would be faster than if there was a greater difference in generated linear motions.

A unidirectional rotational input to the planet carrier 10 of the smaller said gear set, with the ring gears held stationary, would yield a bidirectional rotary output from the planet carrier 12 of the larger said gear set. A bidirectional rotary input of the correct timing and magnitude to the planet carrier 12 of the larger said gear set, with the ring gears held stationary, would yield a unidirectional rotary output from the planet carrier 10 of the smaller said gear set. A constant unidirectional rotary input to the ring gears, being drivingly connected to each other, and the planet carrier 10 of the smaller said gear set held stationary, would yield a rotary motion with a momentary dwell from the planet carrier 12 of the larger said gear set.

Other gear sets can generate a straight line motion from a rotary input. Those gear sets can also be used in similar ways where one gear set is able to have continuous rotational motion while limiting the other gear set, causing it to change directions and oscillate. The concept is the same; therefore the concept won't be repeated for each, but other solutions are illustrated in the drawings and claimed in the claims.

Figure 1:
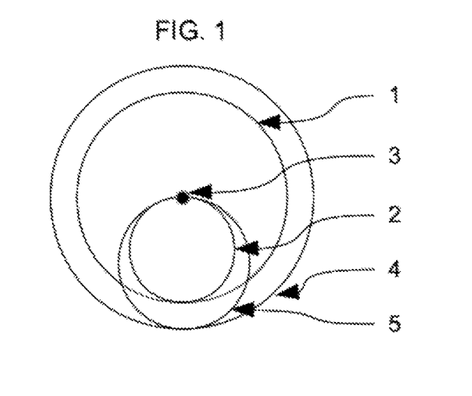
FIG. 1 is a conceptual view of an embodiment comprising hypocycloid gear sets showing the pitch circles of essential gears and the point the essential planet gears are drivingly connected; in what will be referred to as the starting position.

FIG. 1 shows position of the gears of two hypocycloid gear sets when the carrier 12 for the larger essential planet gear 5 is half way in its oscillation. This will be referred to as the starting position. The selected points 3 on the pitch circles of the planet gears 2, 5 are at the center of the ring gears 1, 4.

Figure 2:
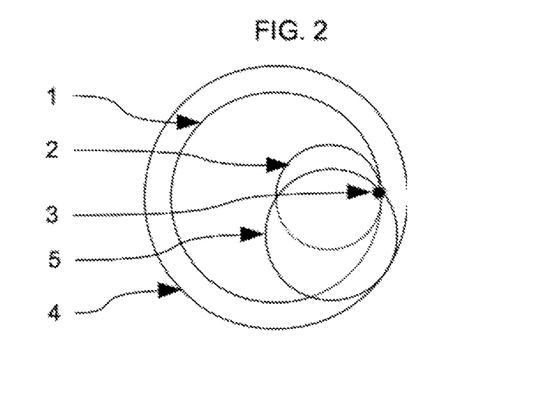
FIG. 2 is a conceptual view of an embodiment comprising hypocycloid gear sets showing the pitch circles of essential gears and the point the essential planet gears are drivingly connected; when the carrier for the smaller essential planet gear has rotated one quarter of a turn counter clockwise from the starting position.

FIG. 2 shows the position of the gears of the said two hypocycloid gear sets when the carrier 10 for the smaller essential planet gear 2 has rotated one quarter turn counter clockwise from the starting position. The selected point 3 on the pitch circle of the smaller essential planet gear 2 has reached its limit in that direction. Since the larger essential planet gear 5 is drivingly connected at said point 3, the smaller essential planet gear 2 stops the larger essential planet gear 5 from going any further and changes its direction, causing the carrier 12 of the larger essential planet gear 5 to change direction of rotation.

Figure 3:
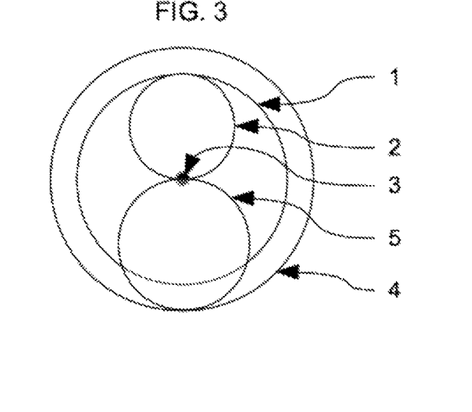
FIG. 3 is a conceptual view of an embodiment comprising hypocycloid gear sets showing the pitch circles of essential gears and the point the essential planet gears are drivingly connected; when the carrier for the smaller essential planet gear has rotated one half of a turn counter clockwise from the starting position.

FIG. 3 shows the position of the gears of the said two hypocycloid gear sets when the carrier 10 of the smaller essential planet gear 2 has rotated another quarter turn counter clockwise where the selected points 3 of the essential planet gears 2, 5 are again at the center as in FIG. 1.

Figure 4:
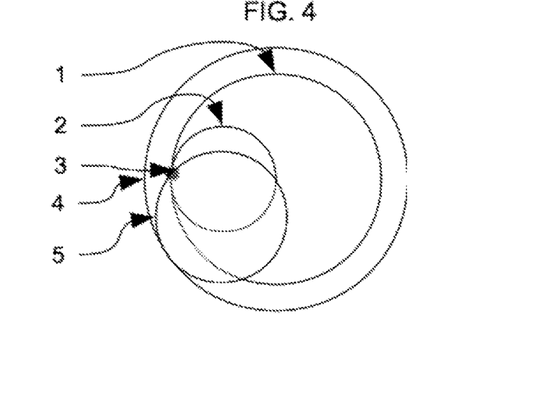
FIG. 4 is a conceptual view of an embodiment comprising hypocycloid gear sets showing the pitch circles of essential gears and the point the essential planet gears are drivingly connected; when the carrier for the smaller essential planet gear has rotated three quarters of a turn counter clockwise from the starting position.

FIG. 4. shows the position of the gears of the said two hypocycloid gear sets when the carrier 10 for the smaller essential planet gear 2 has rotated another quarter turn counter clockwise where the selected point 3 on the pitch circle of the smaller essential planet gear 2 has reached its limit in that direction. Since the larger essential planet gear 5 is drivingly connected at said selected point 3, the said larger essential planet gear 5 and therefore its carrier 12 stop and change direction.

Another quarter turn counter clockwise of the carrier 10 for the smaller essential planet gear 5 brings the gears back to the starting position shown in FIG. 1.

Figure 5:
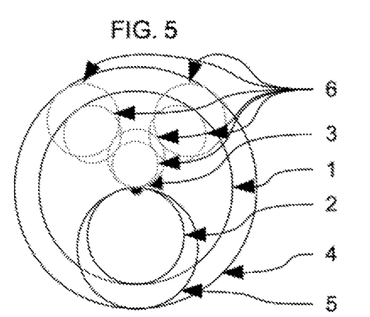
FIG. 5 is a conceptual view of an embodiment using hypocycloid gear sets showing the pitch circles of the essential gears, the point the essential planet gears are drivingly connected, and the pitch circles of a possible arrangement of additional planet gears which could optionally be included; the gears being at the starting position.

FIG. 5 shows another embodiment of the invention where additional planet gears 6 are included on the planet carriers 10, 12 of the said two hypocycloid gear sets for purposes that may include to to distribute the forces to multiple points in the gear sets. Positions of those additional planet gears 6 are to be determined by the engineers.

Figure 6:
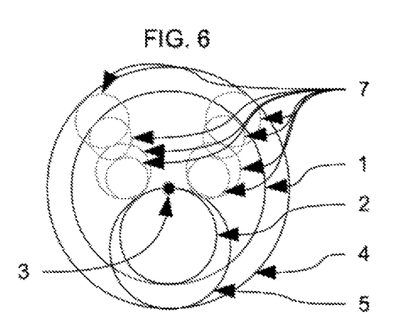
FIG. 6 is a conceptual view of an embodiment using hypocycloid gear sets showing the pitch circles of the essential gears, the point the essential planet gears are drivingly connected, and the pitch circles of another possible arrangement of additional planet gears which could optionally be included; the gears being in the starting position.

FIG. 6 shows yet another embodiment of the invention where additional planet gears 7 are included on the planet carriers 10, 12 of the said two hypocycloid gear sets for purposes that may include to distribute the forces to multiple points in the gear sets. Positions of those additional planet gears 7 are to be determined by the engineers.

Figure 7:
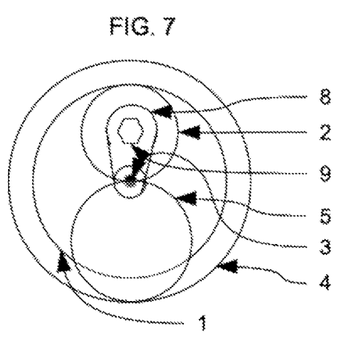
FIG. 7 is a conceptual view of an embodiment using hypocycloid gear sets showing the pitch circles of the essential gears, the point the essential planet gears are drivingly connected, and a method of providing a point of connection for the planet gears; the carrier for the smaller essential planet gear having rotated 180 degrees from the starting point.

FIG. 7, which has the gears of the two said hypocycloid gear sets in the position shown in FIG. 3, shows a means of making the connection of the selected points 3 on the pitch circles of the essential planet gears 2, 5. Since the smaller essential planet gear 2 uses all of its teeth and the pitch circle is within the tooth profile; either the gear needs to have a place of connection as part of the gear, whether provided to the side of the teeth as part of the gear or by making a tooth to have a large enough profile to accommodate a connection, or whether an additional piece 8 is fastened to or drivingly connected to said planet gear 2 so that said additional piece 8 moves as if part of said smaller essential planet gear 2.

FIG. 7 illustrates a means of driving said additional piece 8 by using a hex shaped piece 9 to engage both the planet gear 2 and the additional piece 8. This could be done by other means such as a spline or key. In the same way, an additional piece (not shown) can be attached to or drivingly connected to the larger essential planet gear 5.

If the larger essential planet gear 5 is the only planet gear on its planet carrier 12, then teeth aren't needed on the unused portion of said larger essential planet gear 5 or its ring gear 4. This may provide room for including as part of said planet gear 5 what will be called a lobe which may be large enough to receive the part that is part of, attached to, or drivingly connected to the smaller essential planet gear 2. In the case that such a lobe is included as part of the larger essential planet gear 5, there isn't a need to provide the connection point as an additional piece attached to or drivingly connected to said larger essential planet gear 5.

The point of connection could be by means (not shown) such as a pin provided by piece 8 or as part of the smaller essential planet gear 2, the center of said pin being at the selected point 3 on the pitch circle of the smaller essential planet gear 2 to match with a bearing or bushing provided by the lobe on the larger essential planet gear 5 at selected point 3 on said essential planet gear 5. In the case that the larger essential planet gear 5 doesn't provide said lobe for connection, the bearing or bushing could be provided by an additional piece connected to or drivingly connected to the larger essential planet gear 5 in the same way the additional piece 8 is connected to or drivingly connected to the smaller essential planet gear 2. Other means of connection could be used such as a ball and socket rather than the pin and bearing or bushing. The orientation of these parts could be reversed, such as the pin or ball being connected to or drivingly connected to the larger essential planet gear 5 rather than to the smaller essential planet gear 2.

Figure 8:
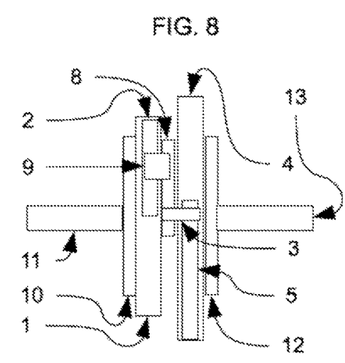
FIG. 8 is a conceptual side view of an embodiment using hypocycloid gear sets, to give a better understanding of the arrangement of the parts; the carrier for the smaller essential planet gear having rotated 180 degrees from the starting point.
Figure 9:
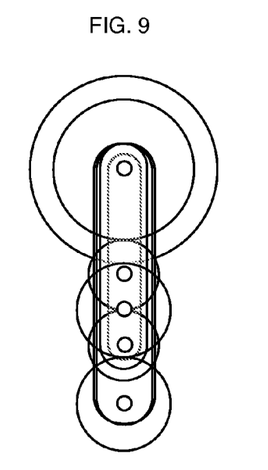
FIG. 9 through FIG. 12 are conceptual views of an embodiment using Cardan style gear sets comprising sun gears, said sun gears being the largest two gears in the drawings. These drawings correspond to those of FIG. 1 through FIG. 4 respectively, the difference being the style of the gear sets.
Figure 10:
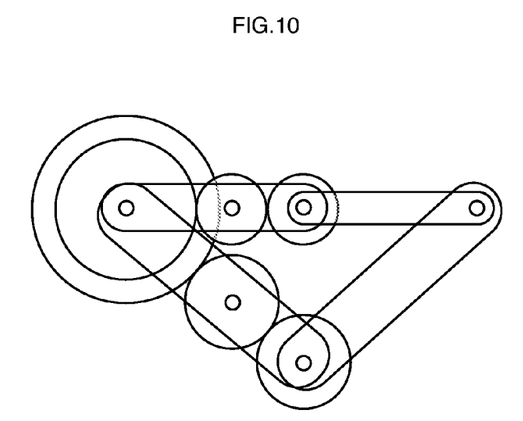
Figure 11:
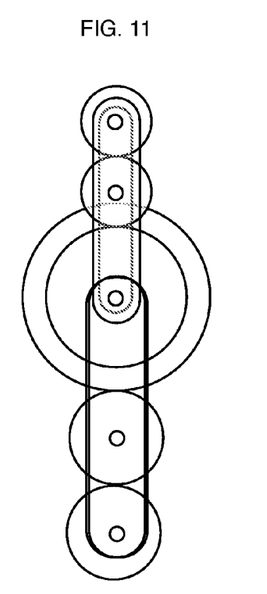
Figure 12:
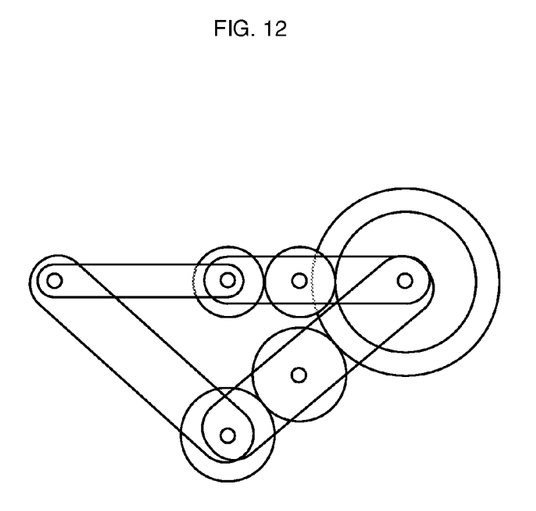
Figure 13:
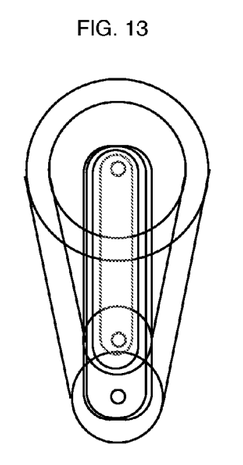
FIG. 13 through FIG. 16 correspond to FIG. 9 through FIG. 12 respectively, the difference being that rather than using an intermediary planet gear to mesh with the sun gear and the other planet gear for the purpose of changing the direction of that said other planet gear, these drawings illustrate using sprockets and a chain (or notched pulleys and belt, or the like).
Figure 14:
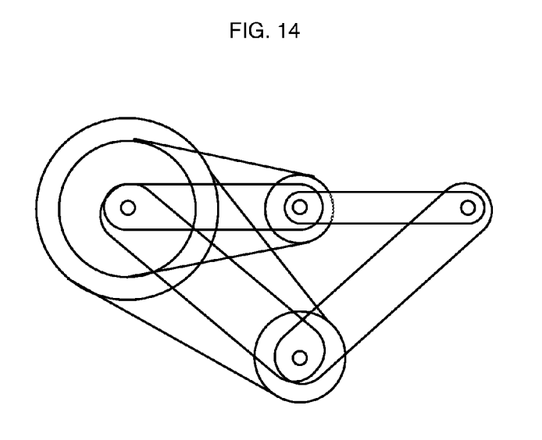
Figure 15:
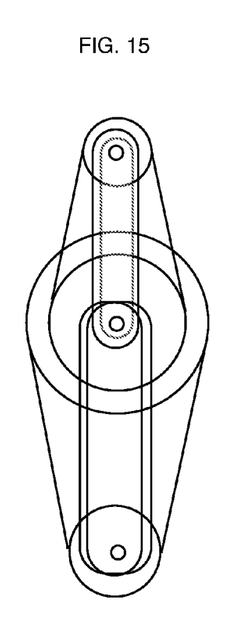
Figure 16:
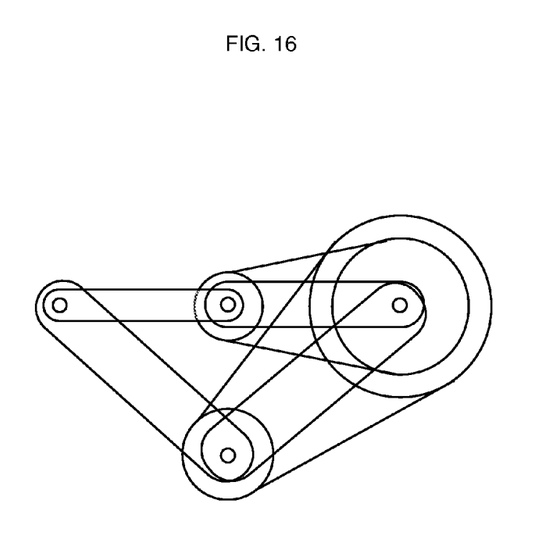

FIG. 8 shows a side view of key parts of the basic embodiment of the hypocycloid gear sets to further clarify what has been described and explained. Going from the rotary member to the oscillating member we can follow the path of motion conversion. Rotary motion drives the shaft 11 which is drivingly connected to the planet carrier 10 of the smaller gear set. Mounted on said planet carrier 10 is at least an essential planet gear 2 which is engaged in tooth mesh with ring gear 1. The additional piece 8 is drivingly connected to said essential planet gear 2 through the hex piece 9 which engages both the essential planet gear 2 and the additional piece 8. Force and motion are thereby transferred from the essential planet gear 2 to the point of connection 3 of the two essential planet gears 2, 5. The motion is now in the form of a straight line through the diameter of the ring gear 1. Force and motion are now transferred to the larger essential planet gear 5 at connection point 3. Said planet gear 5 is in mesh with ring gear 4 of the larger gear set and the straight motion from the connection point 3 is transferred into the rotation of the larger essential planet gear 5. The said planet gear 5 effects its planet gear carrier 12 which is drivingly connected to oscillating shaft 13.

The number of degrees of oscillation would be more if the two gear sets are closer to the same diameter, in which case acceleration and deceleration of the oscillating shaft 13 would be faster. Less degrees of oscillation along with slower acceleration and deceleration of the oscillating shaft 13 can be obtained by having a bigger difference in diameters of the gear sets.

Bidirectional rotary motion can be introduced to said shaft 13 to get a continuous rotary motion at rotary shaft 11. Timing of forces to the oscillating shaft 13 is important to get the rotary motion at shaft 11. A flywheel (not shown) on the rotary shaft 11 would help to assure that oscillating to rotary motion is successful.

The same apparatus can convert unidirectional rotary motion to rotary motion with a momentary dwell by holding shaft 11 stationary and rotating the two ring gears together to get a rotary motion with a momentary dwell at shaft 13 which is drivingly connected to the planet carrier 12 of the larger said gear set. Multiple dwell points can be obtained by adding gear reduction (not shown) to the output shaft 13. It is imagined that the principles of this invention could be further used in more complex assemblies. Principles described herein are claimed for them.

FIG. 9 through FIG. 12 are conceptual views of Cardan style gear sets using stationary sun gears rather than stationary ring gears. These views correspond to FIG. 1 through FIG. 4 with the hypocycloid gear sets. Each Cardan style gear set requires an intermediary planet gear to mesh with the sun gear and the outer planet gear. The intermediary planet gear doesn't need to be in line with the sun gear and the other planet gear as illustrated in the drawing. The pitch circle of the said outer planet gear is two times the diameter of the sun gear of that gear set.

An arm is drivingly connected to the said outer planet gear at one end, and at the other end provides a means to be drivingly connected to a similar arm of the other said gear set. The length of each said arms is so that the distance from the center of the planet gear that drives it to the center of the point of connection with the other arm is equal to the distance from the center of the said planet gear to the central axis of the sun gear of its gear set. In other words, the length of each arm is so that the point of connection to the other arm travels through the central axis of the stationary sun gear of its gear set.

FIG. 13 through FIG. 16 are conceptual views of an alternative to, or another version of, the Cardan style gear sets of FIG. 9 through FIG. 12. The difference is that the intermediary planet gear is eliminated and replaced with a chain or belt, the gears being replaced with sprockets or pulleys to match the chain or belt. This yields the same rotation that was provided by the intermediary gear.

Figure 17:
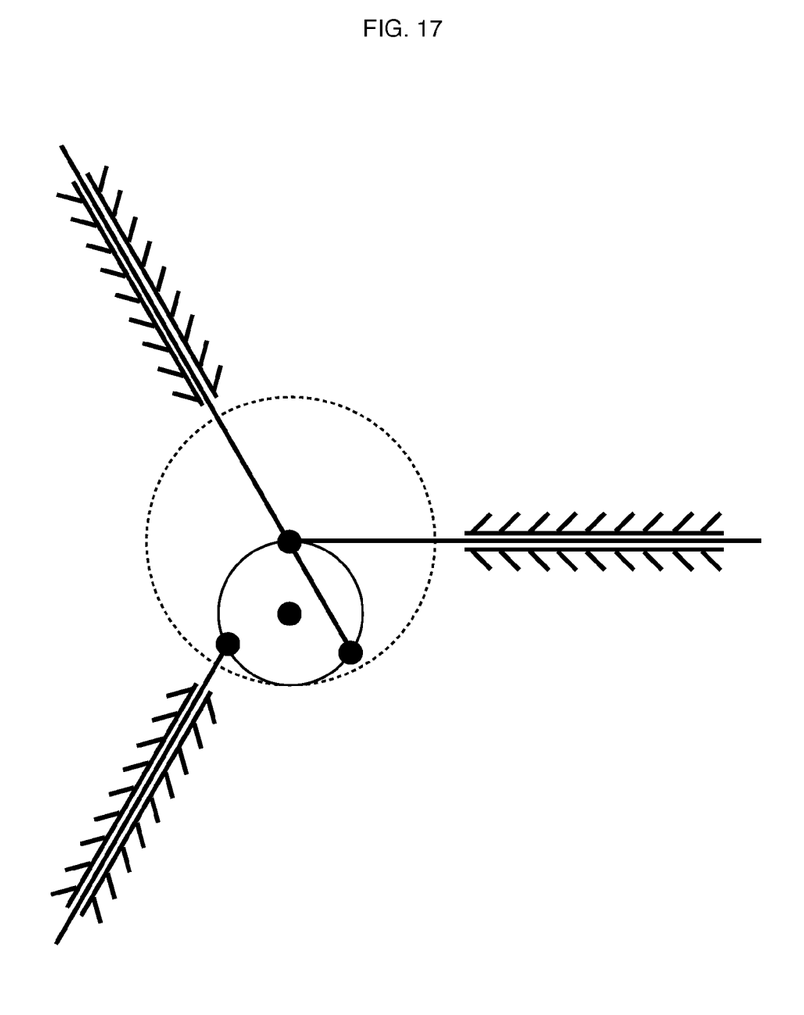
FIG. 17 is a conceptual view showing an alternative to the hypocycloid gear sets used in FIG. 1 through FIG. 4. The dashed circle is an imaginary circle that the other circle rolls around as if in tooth mesh. Two of these devices of differing diameters are used in the same way as the hypocycloid gear sets to accomplish the same thing.

FIG. 17 is a conceptual view of an alternative to the hypocycloid gear sets without using gears. Three points, on what we will call a planet gear without teeth, are each drivingly connected to respective linear bearings. The said three points are each of the same distance from the axle of the said planet gear, and that distance is equal to the distance from the central axis of the carrier of the said planet gear to the axle of the said planet gear. As the carrier rotates, the linear bearings cause the planet gear to rotate as if an imaginary circle oriented to pass through the centers of the three connection points on the said planet gear is rolling inside of an imaginary circle of twice the diameter of that smaller said imaginary circle. A second such gear set of differing diameter is oriented in combination with this gear set in the same way as they hypocycloid gear sets were first described. The result is the same motion which was provided by the hypocycloid gear sets of FIG. 1 through FIG. 4.

Since what really matters is to have two gear sets which each generate the linear motion, any combination of the described gear sets can be used.

The apparatus of this invention was designed with the intended purpose being to convert bidirectional rotary motion from a pendulum type engine to unidirectional rotary output. The apparatus can find other uses where its motion conversion is desired.

The invention claimed is:
1. An apparatus for motion conversion comprising two crank-less motion converting devices;
   each said crank-less motion converting device designed to convert between a reciprocating linear motion and a continuous rotary motion using hypocycloid or Cardan gear mechanism principles;
   each said crank-less motion converting device comprising an essential planet gear on a planet carrier in mesh with either a ring gear according to the hypocycloid principles, or sun gear through the planet gear according to Cardan mechanism principles, said essential planet gear having a pitch circle half the diameter of the pitch circle of the ring or sun gear of the said crank-less motion converting device;
   said crank-less motion converting devices being oriented on parallel planes;
   said crank-less motion converting devices further oriented so that the linear motions generated by said crank-less motion converting devices are parallel;
   said crank-less motion converting devices further oriented so that at least one of said linear motions generated by one of the said crank-less motion converting devices doesn't extend in either direction any further than the other said linear motion generated by the other said crank-less motion converting device;
   said crank-less motion converting devices each comprising a means of being drivingly connected to the other said crank-less motion converting device at the points where the parallel linear motions are generated;
   and said crank-less motion converting devices further oriented so that they can be and are drivingly connected on the generated linear paths so that each of the said crank-less motion converting devices drivingly effects the other.

2. The apparatus of claim 1 wherein one of the said crank-less motion converting devices is designed to generate a longer linear motion than the linear motion generated by the other said crank-less motion converting device.

3. The apparatus of claim 2 wherein a shorter linear motion generated by one of the said crank-less motion converting devices doesn't extend as far in either direction as the linear motion generated by the other said crank-less motion converting device.

4. The apparatus of claim 2 wherein the two said crank-less motion converting devices share a common central axis.

5. The apparatus of claim 4 wherein at least one of the crank-less motion converting devices comprises at least one additional planet gear on the planet carrier of said crank-less motion converting device in mesh with the essential planet gear on the said planet carrier of the said crank-less motion converting device;
   said crank-less motion converting device further comprising, for each said additional planet gear, at least one planet gear on the said planet carrier in mesh with said additional planet gear and with the ring gear of the said crank-less motion converting device.

6. The apparatus of claim 3 wherein at least one of the crank-less motion converting devices comprises at least one additional planet gear on the planet carrier of said crank-less motion converting device in mesh with the essential planet gear on the said planet carrier of the said crank-less motion converting device;
   said crank-less motion converting device further comprising, for each said additional planet gear, at least one planet gear on the said planet carrier in mesh with said additional planet gear and with the ring gear of the said crank-less motion converting device.

7. The apparatus of claim 2 wherein at least one of the crank-less motion converting devices comprises at least one additional planet gear on the planet carrier of said crank-less motion converting device in mesh with the essential planet gear on the said planet carrier of the said crank-less motion converting device;
   said crank-less motion converting device further comprising, for each said additional planet gear, at least one planet gear on the said planet carrier in mesh with said additional planet gear and with the ring gear of the said crank-less motion converting device.

8. The apparatus of claim 1 wherein at least one of the crank-less motion converting devices comprises at least one additional planet gear on the planet carrier of said crank-less motion converting device in mesh with the essential planet gear on the said planet carrier of the said crank-less motion converting device;
   said crank-less motion converting device further comprising, for each said additional planet gear, at least one planet gear on the said planet carrier in mesh with said additional planet gear and with the ring gear of the said crank-less motion converting device.

* * * * *